March 17, 1953 J H. HUNT 2,631,895
COVER FOR VEHICLE WHEELS
Filed May 20, 1949

Inventor
J HAROLD HUNT
By Barnes, Kisselle, Laughlin & Raisch
Attorneys

Patented Mar. 17, 1953

2,631,895

UNITED STATES PATENT OFFICE 2,631,895

COVER FOR VEHICLE WHEELS

J Harold Hunt, Lansing, Mich., assignor to Motor Wheel Corporation, Lansing, Mich., a corporation of Michigan Application May 20, 1949, Serial No. 94,473

8 Claims. (Cl. 301—37)

This invention relates to a cover for a vehicle wheel.

This invention is particularly concerned with a cover for a vehicle wheel which is attached to the rim of the wheel and covers substantially the entire front of the wheel.

It is an object of this invention to produce an arrangement for removably securing the cover to the wheel rim which is simple, cheap, efficient in operation, and which lends itself to easy and quick attachment of the cover to, and detachment from, the wheel rim.

Figure 1:
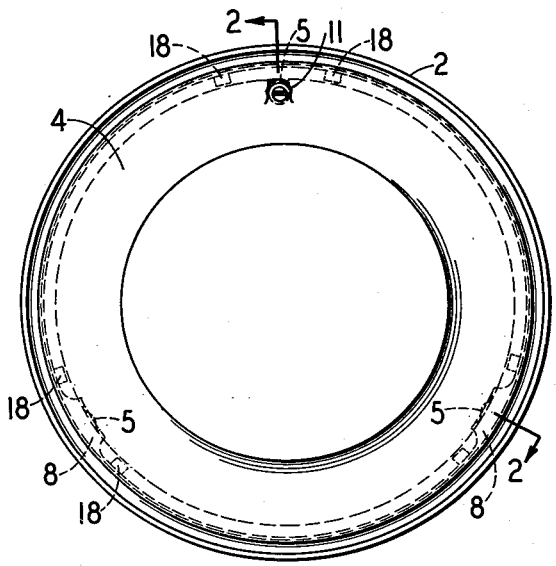
Fig. 1 shows a front view of a wheel with my cover attached thereto.
Figure 2:
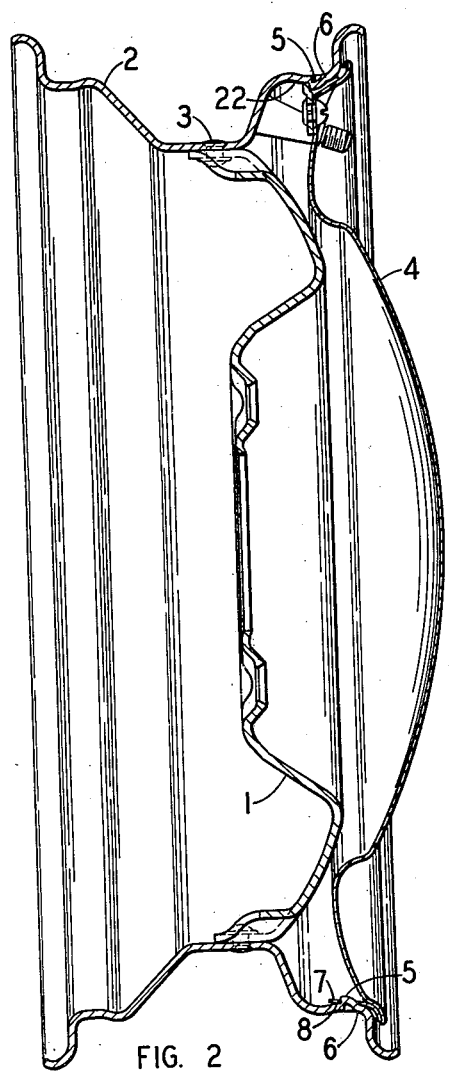
Fig. 2 is a section through the wheel and cover taken on the line 2—2 of Fig. 1.

Referring more particularly to the drawings there is shown a wheel comprising a stamped metal body 1 and a rim 2 which is connected to the body 1 by rivets 3. The cover is designated 4 and preferably takes the form of a sheet metal stamping but, of course, can be made from any other suitable material. The rim 2 is provided with a plurality of inwardly extending projections 5. For purposes of description I have shown three projections 5 which are equally spaced about the circumference of the rim 2. Projections 5 preferably are sheared radially inwardly from the outer tire bead seat portion 6 of the rim 2 so as to form a shoulder 7 on the inside of the rim at the bead seat 6.

Cover 4 is preferably a sheet metal stamping and is provided with two, preferably but not necessarily, integral tabs 8. Each tab 8 is provided with a shoulder for interengagement with a projection 5. Such shoulder can be formed by providing each tab with an opening 9, the outer edge 10 of which is preferably straight and forms a shoulder. Tabs 8 are equally spaced from each other and from an indentation in the cover 4 which forms a pocket 11. Thus, the positions of tabs 8 and pocket 11 correspond to the positions of projections 5. The indentation or pocket 11 serves as a support for the cam 12 which is preferably rotatably mounted thereon by a pin 13 which is journalled in an opening 14 in the wall of pocket 11 and is provided with a square shank 15 which fits in a square opening in cam 12. Pin 13 is provided preferably with a grooved head 16 for actuation by a screwdriver and the opposite end of pin 13 is riveted over as at 17.

A plurality of bumpers 18 are preferably provided between the rim and the circumferential edge portion 19 of cover 4. These bumpers can be separate from, or integral with, the cover 4 and made from any suitable distortable or resilient material. By way of description bumpers 18 comprise small rubber blocks fixed to the inner face of cover 4 on opposite sides of tabs 8 and cam 12. Cam 12 is provided with an eccentric cam surface 20 and a shoulder 21.

Figure 5:
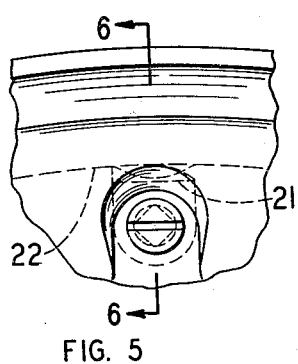
Fig. 5 is an enlarged front view of a portion of the rim and cover showing the cam fastener.
Figure 3:
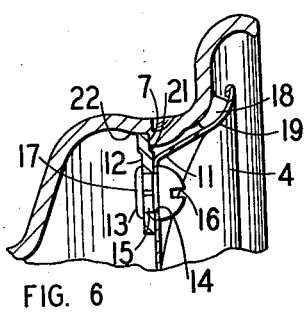
Fig. 3 is a top or edge view of the cover in the area of one of the apertured fastening tabs.
Figures 4, 6:
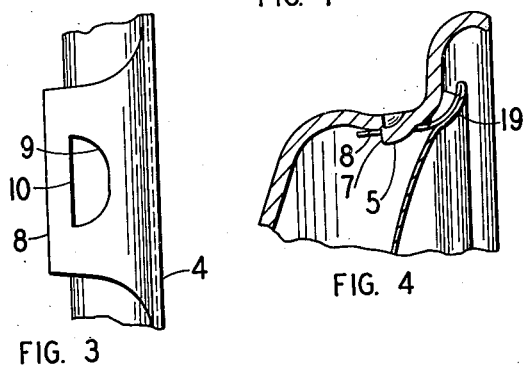
Fig. 4 is an enlarged detail sectional view of a portion of one of the connections between the rim and cover.
Fig. 6 is a sectional view taken along the line 6—6 of Fig. 5.
Figure 8:
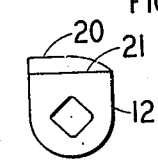
Fig. 8 is a detail of the cam.
Figure 7:
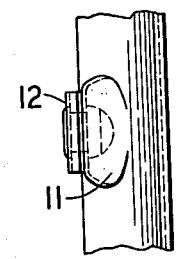
Fig. 7 is a top plan or edge view of the cam and the portion of the cover adjacent the cam connection.

To mount the cover on the wheel, cam 12 is first rotated to a position about 90° counterclockwise from the position shown in Fig. 5 and the cover is then placed with the two apertured tabs 8 over two of the projections 5 with the shoulders 7 interengaging the edge portions 10 of aperture 9. The cover is moved inwardly against bumpers 18 to a position where shoulder 21 clears shoulder 7 on projection 5 and cam 12 is now rotated clockwise. As cam 12 rotates clockwise, the outer edge portion of cam 12 engages behind shoulder 7 of the third projection 5 and the cam edge 20 engages the inner face 22 of bead seat 6 when cam 12 reaches substantially the radial position shown in Fig. 5. At this time pressure is removed from cover 4 and the tension of rubber pads 18 or the tension of circumferential edge portion 19 of stamped metal cover 4 causes cover 4 to move slightly outwardly until shoulder 21 of cam 12 is positioned beneath the shouldered edge 7 of projection 5. Thus, straight shoulder 21 cooperates with projection 5 to lock cam 12 against turning because if the cam 12 turns counterclockwise from the position shown in Fig. 5, shoulder 21 will engage projection 5 and prevent further counterclockwise rotation and disengagement of cam 12 from projection 5.

To remove the cover, the cover is pushed inwardly in the neighborhood of cam 12 so that shoulder 21 will clear shoulder 7 of projection 5 and the cam is turned to the left or counterclockwise to disengage the cam from projection 5 whereupon the cover is pulled away from the wheel and lifted off the other two projections 5.

When the cover is mounted on the wheel it will be seen that it is under an axially outward force due to the elasticity of rubber bumpers 18 or the elasticity of the circumferential edge portion of cover 4.

I claim:

1. The combination with a vehicle wheel rim having a plurality of similar shoulders on the inner face thereof, of a cover having at least two apertured axially inwardly extending tabs and interengaging two of said shoulders in said apertures, a rotatable cam member mounted on said cover adjacent an edge thereof and interengaged behind the axially inner face of another of said shoulders on said rim, the outer edge of said cam also contacting the inner face of the rim when the cam is interengaged with its cooperating shoulder, said cam being rotatable away from the inner face of the rim to release the same from its cooperating shoulder on the rim whereby the tabs can be disengaged from said other shoulders and the cover removed from said rim.

2. The combination with a vehicle wheel rim having a plurality of similar shoulders on the inner face thereof, of a cover having at least two shouldered axially inwardly extending tabs and interengaging the axially inner face of two of said shoulders on said rim, a movable latch member mounted on said cover adjacent an edge thereof and interengaged behind the axially inner face of another of said shoulders on said rim, the outer edge of said latch member also contacting the inner face of the rim when the latch member is interengaged with its cooperating shoulder, said latch member being movable away from the inner face of the rim to release the same from its cooperating shoulder on the rim whereby the tabs can be disengaged from said other shoulders and the cover removed from said rim.

3. The combination with a vehicle wheel rim having a plurality of shoulders on the inner face thereof, of a cover having at least two apertured axially inwardly extending tabs and interengaging two of said shoulders in said apertures, a rotatable cam member mounted on said cover adjacent an edge thereof and interengaged behind another of said shoulders on said rim, the outer edge of said cam also contacting the inner face of the rim when the cam is interengaged with its cooperating shoulder, said cam being rotatable away from the inner face of the rim to release the same from its cooperating shoulder on the rim whereby the tabs can be disengaged from said other shoulders and the cover removed from said rim, said cam being provided with a shoulder inwardly of its cam edge which is arranged to abut the shoulder on the rim when the cam is turned to thereby hold the cam against turning whereby the cover must be first moved axially inwardly of the rim so that the shoulder on the cam will clear the shoulder on the rim preparatory to turning the cam to disengaged position.

4. The combination claimed in claim 3 including resilient means for urging the cover axially outwardly of the rim to thereby hold the cam and apertured tabs in contact with their cooperating shoulders on the rim.

5. The combination claimed in claim 4 wherein said resilient means takes the form of rubber bumpers positioned between the cover and the rim.

6. The combination with a vehicle wheel rim having a plurality of circumferentially spaced shoulders on the inner face of the rim, of a sheet metal cover having at least two circumferentially spaced apertures adjacent the edge of the cover and interengaged with two of said shoulders on the rim and a cam latch carried by said cover and interengaging the third of said shoulders on the rim to removably lock the cover to the rim, elastic means for urging said cover axially outwardly from said rim, the said cam latch being rotatably mounted on the cover and the edge of the cam engaging the inner face of the rim when the cam is fully engaged behind its cooperating shoulder on the rim, said cam latch being also provided with a shoulder between its center of rotation and its cam edge, which shoulder interengages the shoulder on the rim to lock the cam latch in engaged position, said shoulder on the cam latch being disengageable from the shoulder on the rim by forcing the cover axially inwardly toward the rim whereby the cam latch can be disengaged from its cooperating shoulder on the rim by turning the same.

7. The combination with a vehicle wheel rim having a plurality of circumferentially spaced similar shoulders on the inner face of the rim, of a sheet metal cover having at least two circumferentially spaced apertures adjacent the edge of the cover and interengaged with the axially inner faces of two of said shoulders on the rim and a cam latch carried by said cover and interengaging the axially inner face of the third of said shoulders on the rim to removably lock the cover to the rim, elastic means for urging said cover axially outwardly from said rim, said shoulders being equally spaced one from the other, and said apertures and cam latch being equally spaced one from the other corresponding to said projections, the cam latch being rotatably mounted on the cover and the edge of the cam engaging the inner face of the rim when the cam is fully engaged behind its cooperating shoulder on the rim.

8. The combination with a vehicle wheel rim having shoulder means on the inner face thereof, of a cover having at least two circumferentially spaced members fixed thereon and interengaging said shoulder means at two points spaced circumferentially of the rim, a movable latch member mounted on said cover adjacent an edge thereof and spaced circumferentially from said two members on said cover, said movable latch member being interengaged behind the axially inner face of said shoulder means on said rim, the outer edge of said latch member also contacting the inner face of the rim when the latch member is interengaged with said shoulder means, said latch member being movable away from the inner face of the rim to release the same from said shoulder means on the rim whereby said two members on said cover can be disengaged from said shoulder means and the cover thereby removed from the rim.

J HAROLD HUNT.

REFERENCES CITED

The following references are of record in the file of this patent:

UNITED STATES PATENTS

| Number | Name | Date |
|---|---|---|
| 1,992,759 | Nehls | Feb. 26, 1935 |
| 2,006,639 | Horn | July 2, 1935 |
| 2,016,395 | Sinclair | Oct. 8, 1935 |
| 2,031,092 | Begg | Feb. 18, 1936 |
| 2,076,789 | Le Jeune | Apr. 13, 1937 |
| 2,222,625 | Mills | Nov. 26, 1940 |
| 2,404,390 | Lyon | July 23, 1940 |
| 2,600,412 | Lyon | June 17, 1952 |